V. W. PAGE.
PINION SHAFT HOUSING.
APPLICATION FILED APR. 20, 1921.
1,420,497.
Patented June 20, 1922.
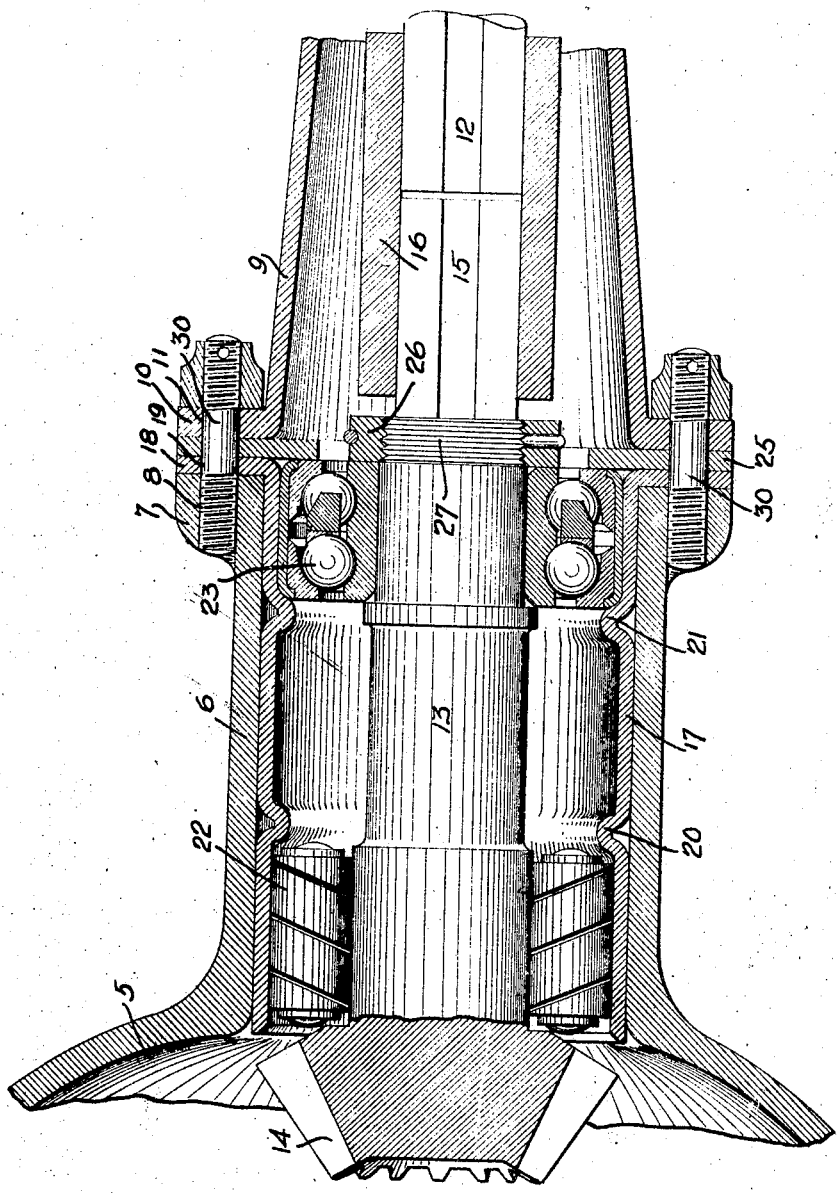
WITNESSES
Grace Valentine
Inventor
VICTOR W. PAGE
By Attorney Munn & Co.

UNITED STATES PATENT OFFICE.

VICTOR W. PAGÉ, OF NEW YORK, N. Y.

PINION-SHAFT HOUSING.

1,420,497.  Specification of Letters Patent.  Patented June 20, 1922.

Application filed April 20, 1921. Serial No. 462,879.

*To all whom it may concern:*

Be it known that I, VICTOR W. PAGÉ, a citizen of the United States, and a resident of the city of New York, Kew Gardens, borough of Queens, in the county of Queens and State of New York, have invented a new and Improved Pinion-Shaft Housing, of which the following is a full, clear, and exact description.

The present invention relates to new and useful improvements in pinion shaft housings for motor vehicle drives, and it has for its primary object to provide a new and improved construction which will permit of the use of magnalite, lynnite and other aluminum alloys in this connection with the result that the various advantages gained from using light material for this purpose will be attained without loss of strength and durability necessary to these parts of a motor vehicle driving mechanism. Heretofore axle housings, pinion housings, and the like, have been formed from hard metal which has its disadvantages, as, for example, excess weight, liability to fracture through its brittleness, together with many difficulties in the working of said metal to form these several parts. Aluminum alloys are known to be relatively light but under ordinary conditions are not adaptable for this use for the reason that they are not possessed of sufficient strength to withstand the stresses and strains to which this portion of the driving mechanism of a motor vehicle is subjected under ordinary driving conditions. It is, therefore, another object of the invention to so construct this portion of the driving mechanism of a motor vehicle that the light materials above mentioned may be used to provide the rear axle, differential, and pinion shaft housings, thus gaining the many advantages above mentioned by the use of these materials.

Reference is had to the accompanying drawings in which the figure is a longitudinal sectional view of the rear end of a propeller shaft housing, a complete pinion shaft housing and a portion of the differential mechanism housing.

Referring more particularly to the drawings, the reference character 5 designates the differential section of the rear axle housing, and said rear axle housing is provided at this point with a forward tubular extension 6 formed with a flange, lugs, or the like 7, at its forward end, the said flange or lugs being provided with internally screw-threaded openings 8. The reference character 9 designates the rear end of the propeller shaft housing and said rear end is formed with an annular flange 10 provided with a plurality of openings 11. Extending rearwardly of the propeller shaft housing 9 is a propeller shaft 12, and mounted in the pinion shaft housing 6 is a pinion shaft 13, the rear end of which carries a pinion 14. The forward end 15 of the pinion shaft 13 is operatively connected with the rear end of the propeller shaft 12 by means of a sleeve or the like 16. The reference character 17 designates a sleeve formed of steel or other suitable hard material and said sleeve is of an external diameter substantially equal to the internal diameter of the pinion shaft housing 6 in order that said sleeve may have a snug fit therein. This sleeve is provided upon its forward end with a flange 18 and said flange 18 is adapted for engagement with the flange or lugs 7 of the pinion shaft housing 6 as shown, said flange 18 having a plurality of openings 19. This internal sleeve 17 is crimped or rolled to form inwardly-projecting beads or the like 20 and 21.

The reference character 22 designates a roller bearing placed in the rear end of the sleeve 17 and said roller bearing is adapted to receive the lateral thrusts of the pinion shaft during its operation. This roller bearing 22 is prevented from moving forwardly of the sleeve by reason of the inwardly positioned bead 20 heretofore mentioned.

To provide for the longitudinal thrust of the pinion shaft 1*, a bearing 23 of the ball type is employed, and said bearing is inserted in the forward end of the sleeve 17 and is maintained against movement rearwardly of the sleeve 17 by the inwardly projecting bead 21.

After the bearings 22 and 23 and pinion shaft 13 have been positioned, a plate 25 is interposed between the flange 18 of the sleeve 17 and the flange 10 of the propeller shaft housing 9 and said plate serves to prevent forward movement of the bearing 23 relatively to the sleeve 17. In addition to this plate 25, the bearing 23 is maintained against forward movement by means of a nut 26 engaging a screw-threaded portion 27 of the pinion shaft 13, said nut engaging the inner race of the bearing 23. In addition to the crimped beads 20 and 21 forming means for positioning and retaining the bearings 22 and 23 in position in the sleeve 17, they serve to strengthen the sleeve 17, in order that the same may be more capable of withstanding both longitudinal and lateral thrusts.

The device is assembled in the following manner:

The bearing 22 having been inserted in the sleeve 17, the pinion shaft is next inserted after which the bearing 23 is inserted and the entire device, i. e., the sleeve 17, pinion shaft 13, and the bearings 22 and 23, are positioned in the pinion shaft housing 6. After this has been done, the plate 25 is next positioned, after which a plurality of bolts 30 are employed to secure the rear end of the propeller shaft housing, the plate 25 and the sleeve 17, to the pinion shaft housing 6, the bolts 30 passing through the flange 10 of the propeller shaft housing, the plate 25, the flange 18 of the sleeve 17, and the flange or lugs 7 of the pinion shaft housing 6.

From the foregoing it will be apparent that the present invention provides a structure by means of which relatively light material, such as magnalite, lynnite, and other aluminum and magnesium alloys which ordinarily would not serve the purpose of rear axle, differential, and pinion shaft housings, may be employed since by reason of the inserted sleeve, sufficient strength and rigidity is had, which strength and rigidity is sufficient to overcome the disadvantages in this respect of the materials above mentioned for use in this connection.

I claim:

1. A pinion shaft housing for rear axle constructions comprising a tubular member projecting forwardly from the axle housing, a sleeve adapted to be received within said tubular member, said sleeve being rolled to provide continuous inwardly - disposed shoulders, a shaft, roller bearings supporting said shaft and carried within the sleeve, said shoulders forming means for preventing movement of the roller bearings longitudinally of the sleeve, and means for preventing movement of said sleeve relative to the forwardly projecting tubular member.

2. In combination with a propeller shaft housing form 1 of a relatively hard metal, a pinion shaft housing formed of a relatively soft metal, a lining for said pinion shaft housing, said lining being formed of relatively hard material, and means for securing the propeller shaft housing, the pinion shaft housing, and lining for the pinion shaft housing together to provide a unitary structure.

3. In combination with a propeller shaft housing formed of a relatively hard metal, a pinion shaft housing formed of a relatively soft metal, a lining for said pinion shaft housing, said lining being formed of relatively hard material, and means for securing the propeller shaft housing, the pinion shaft housing, and lining for the pinion shaft housing together to provide a unitary structure, whereby the lateral and longitudinal thrusts of the lining will be transmitted to the propeller shaft housing.

VICTOR W. PAGÉ.